United States Patent
Rick

[15] 3,673,654
[45] July 4, 1972

[54] CUTTING HEAD FOR A CHAMFERING TOOL

[72] Inventor: Frank G. Rick, 114 Gilfillan Street, Franklin, Pa. 16323

[22] Filed: June 18, 1970

[21] Appl. No.: 47,191

[52] U.S. Cl. ................................................29/97, 90/52
[51] Int. Cl. .........................................................B26d 1/00
[58] Field of Search ....................................29/96, 97; 90/52

[56] References Cited

UNITED STATES PATENTS 2,651,223   9/1953   Hahn ...........................................29/96

Primary Examiner—Francis S. Husar
Attorney—Charles L. Lovercheck

[57] ABSTRACT

A cutter bit made up of a cutter head block, a fixed cutter and a rotary cutter bit in said block. The fixed cutter is provided to do a limited amount of cutting along the side edge of a plate and the rotary cutter is free to rotate in the hollow in a cylindrical hollow bore in the cutter head block. The inner end of the rotary cutter rests on a thrust bearing and a threaded member positions the rotary cutter in the bore. Suitable lubrication fittings are provided to supply lubricant to the inside of the hollow around the cutter.

4 Claims, 4 Drawing Figures

PATENTED JUL 4 1972 3,673,654
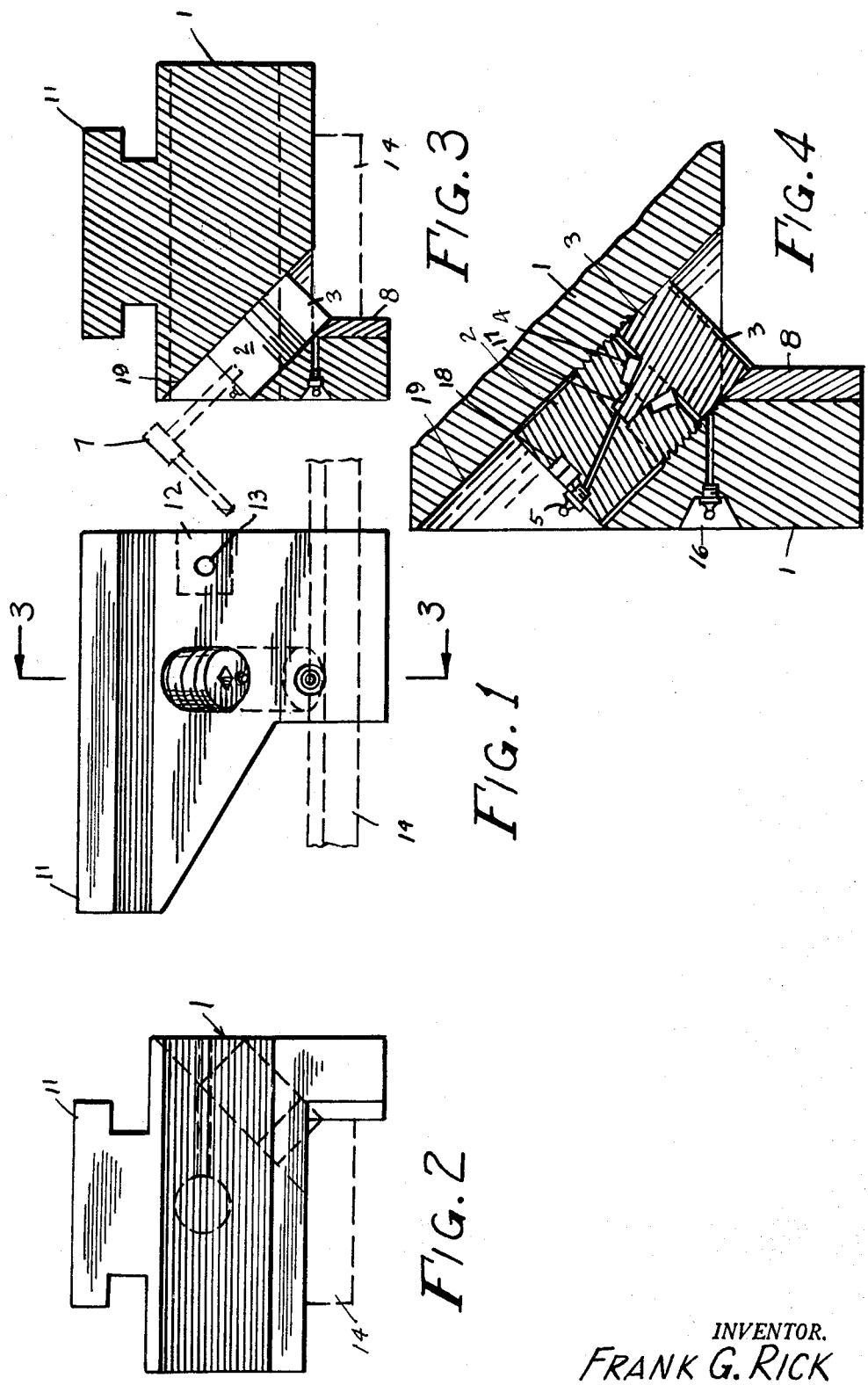
INVENTOR.
FRANK G. RICK
BY
Charles L. Lombach
ATTORNEY.

CUTTING HEAD FOR A CHAMFERING TOOL

STATEMENT OF INVENTION

This invention relates to machine tools and, more particularly, to machine tools for cutting chamfers on plates and other structural members.

OBJECTS OF THE INVENTION

It is an object of the invention to provide an improved cutting bit for machine tools.

Another object is to provide an improved cutter for chamfering machines.

Another object is to provide a cutter for metal which is simple in construction, economical to manufacture, and simple and efficient to use.

Another object is to provide an improved rotary cutter for a chamfering machine.

DESCRIPTION OF THE DRAWINGS

FIG. 1 is a side view of the cutter according to the invention.
FIG. 2 is a front end view of the cutter.
FIG. 3 is a cross sectional view taken on line 3—3 of FIG. 1.
FIG. 4 is a partial enlarged view of FIG. 3.

DETAILED DESCRIPTION OF THE DRAWINGS

Now with more particular reference to the drawings, the cutter shown in this disclosure is intended to be used in a chamfering machine such as shown in my co-pending application, Ser. No. 47,190. The cutter is made up of a cutter head block 1, a rotary cutter bit 3, a follower edge bit 8, and a threaded adjusting block 2 with thrust bearing 4.

The cutter head block 1 may be made of a rugged piece of steel which has an elongated T-shaped member 11 on its upper part. The T-shaped member 11 is adapted to be received in a T-shaped guideway in a chamfering machine. A provision is made for receiving the end of a piston rod in a blind hole 12 for moving the cutter and the piston rod may be attached by means of a suitable pin 13.

A hollow threaded bore 19 is provided in the cutter head block and this bore 19 is disposed at an acute angle to the fixed cutting blade 8 which may be sweated to the cutter head block. The fixed cutter 8 is adapted to move along the edge of a plate 14, which is being chamfered, and which will be supported on a machine tool table, as suggested in the companion patent application, Ser. No. 47,190.

The cylindrical rotary cutter member 3 is rotatably and freely received in the bore 19. The rotary cutter member 3 has a projection 17 which is received in the thrust bearing 4. The thrust bearing may be any suitable kind of a roller bearing or a ball bearing. Lubricant is supplied to the bearing 4 by means of a grease fitting 5 and lubricant is supplied to the rotary cylindrical cutter bit 3 by means of the grease fitting 16.

A non-circular hole 18 is provided in the adjusting block 2 and this hole 18 may receive a wrench 7 for adjusting the adjusting block to move the cutting edge of rotary cutter 3 to the desired position relative to the follower edge bit 8.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A cutter for a machine tool comprising,
   a cutter head block,
   means on said cutter head block to support it on a machine tool,
   means on said cutter head block for engaging an actuating member on said machine tool,
   a cylindrical bore in said cutter head block,
   a rotary cutter bit disposed in said cylindrical bore and free to rotate therein,
   an adjusting plug threadably received in said bore,
   a thrust bearing means supported on said adjusting plug and engaging said rotary cutter bit whereby said rotary cutter bit may freely rotate in said head block,
   a fixed follower bit is fixed to said head block and disposed at an acute angle to said bore whereby said follower bit may engage the sides of a plate and said rotary cutter may engage an edge and chamfer a corner from said plate.

2. The cutter recited in claim 1 wherein slidable means is provided on said cutter head block for slidably supporting said cutter on a chamfering machine.

3. The cutter recited in claim 2 wherein means is provided for applying a force to said actuating member and to said cutter whereby said cutter is moved on said machine.

4. The cutter recited in claim 3 wherein said slidable means comprises a T-shaped member adapted to engage a T-slot on said chamfering machine.

* * * * *